United States Patent Office 3,605,694
Patented Sept. 20, 1971

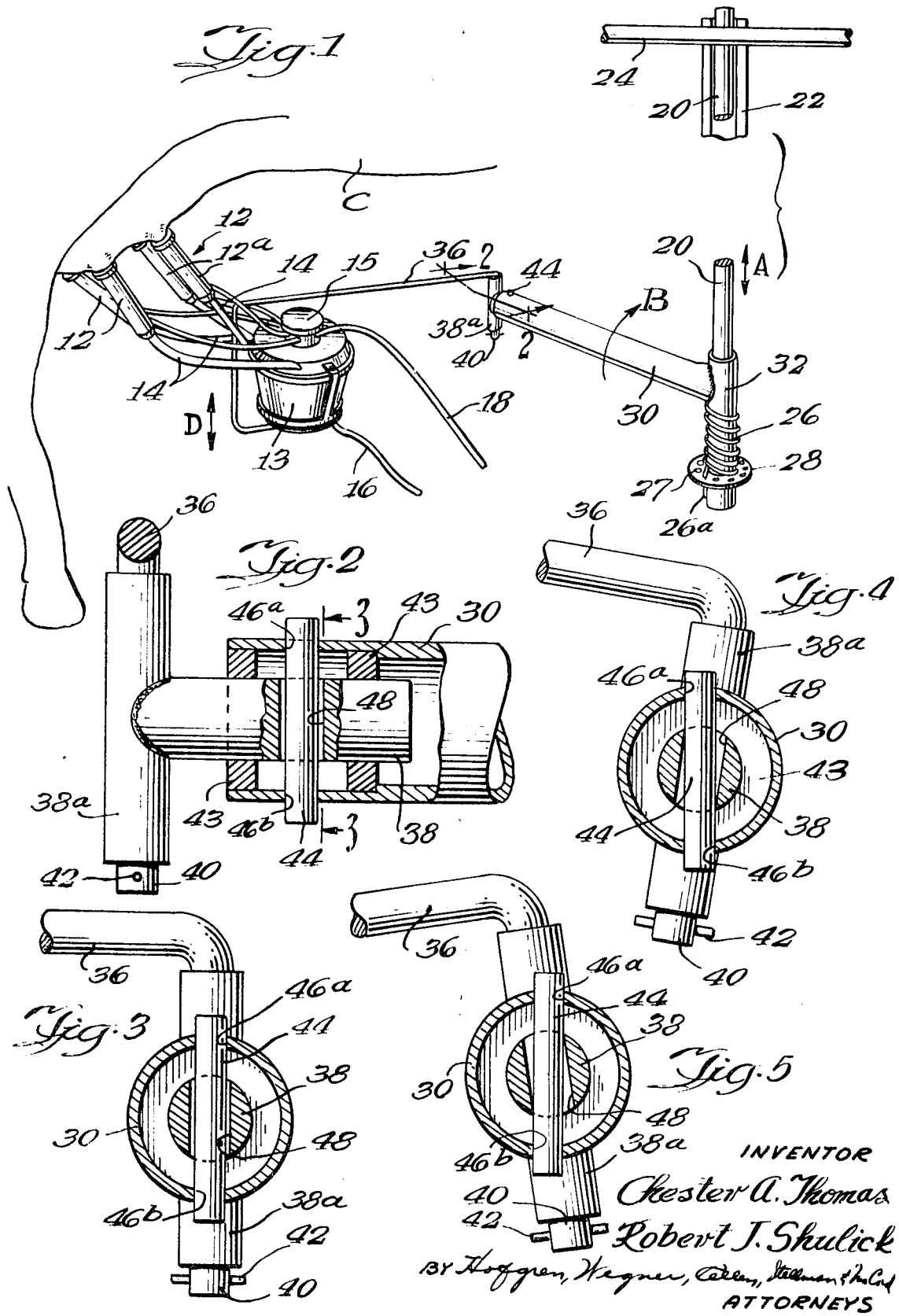

3,605,694
MILKER SUPPORT WITH SLACK TAKE UP
Chester A. Thomas, Lake Forest, and Robert J. Shulick,
St. Charles, Ill., assignors to Babson Bros. Co.
Filed Aug. 20, 1969, Ser. No. 851,630
Int. Cl. A01j 7/00
U.S. Cl. 119—14.1          5 Claims

ABSTRACT OF THE DISCLOSURE

A supporting mechanism for a milking apparatus which includes a vertically adjustable member having a generally horizontally disposed arm member mounted thereon, the arm having a free end operatively connected to and supporting a milk receiving receptacle beneath a cow. The arm is of a strength sufficient to support the receptacle when disconnected from the cow's teats. A loose connection means is provided between the arm and the adjustable member to permit limited vertical movement of the arm relative to the member between upper and lower limit positions with the receptacle hanging substantially by gravity from the cow's teats only when the arm is between those positions. Stops are provided to prevent movement of the arm above the upper limit position to prevent the teat cups of the milking apparatus from riding up the cow's teats and to prevent movement of the arm below the lower limit position to support the receptacle if the cups are disconnected from the cow's teats.

BACKGROUND AND SUMMARY OF THE INVENTION

This invention relates to a milker support and particularly to an improved connection means for the arm portion of an adjustable supporting means for automatic milking apparatus during a milking operation.

In carry-away milking systems, milk is withdrawn from the cow's teats through a teat cup assembly attached to the teats and connected through a suitable means to a carry-away pipeline. To provide a proper tug and pull action on the cow's teats, it is desirable to support the teat cup assembly at a proper elevation and in a manner allowing a downward and forward force to be exerted, through the teat cups, on the cow's teats. Forms of such apparatus are shown in the Thomas Pat. 2,783,737, issued Mar. 5, 1957, and the Babson Pat. 3,033,161, issued May 8, 1962. Both of these patents show vertically elongated members constrained for longitudinal movement and with a horizontally disposed arm portion mounted on the lower end of the elongated member for supporting elements of the milking system below the cow. The instant invention relates to an improved connecting means between the arm portion and the vertically adjustable elongated member.

Therefore, a principal object of this invention is to provide a new and improved means for adjustably supporting a milking apparatus.

Another object of the invention is to provide a supporting mechanism for a milking apparatus which includes a relatively rigid support structure, a vertically adjustable elongated member mounted on the support structure, a milk receiving receptacle having attached thereto cups adapted to receive a cow's teats for milking, and a generally horizontally disposed arm member horizontally and yieldably pivoted to the adjustable member and having a free end operatively connected to and supporting the receptacle below the cow. The arm is of a strength sufficient to support the receptacle when the cups are disconnected from the cow's teats. A loose connecting means is provided between the arm and the adjustable member to permit limited vertical movement of the arm relative to the elongated member between upper and lower limit positions. The receptacle hangs substantially by gravity from the cow's teats only when the arm is between said positions. A stop means is provided to prevent vertical movement of the arm relative to the adjustable member upwardly beyond the aforesaid upper limit position to prevent the cups from riding up the cow's teats. A stop means also is provided to prevent vertical movement of the arm relative to the adjustable member downwardly below the aforesaid lower limit position to support the receptacle if the cups are disconnected from the teats. The receptacle thereby provides a proper tug and pull action on the cow's teats between these two limit positions, but eliminates the undesirabilities of having the cups ride up the cow's teats or having the receptacle fall to the ground should the cups become disconnected from the teats.

A further object of this invention is to provide a supporting mechanism as set forth in the preceding paragraph wherein said connecting means is a pivot connection between the arm and the adjustable member, which connection defines a generally horizontal pivot axis with the free end of the arm pivoting about said axis generally vertically between the upper and lower limit positions. The pivot connection is a telescopic connection defined by a pair of telescopic cylindrical members, one on the arm and one operatively mounted on the adjustable member. The axes of the cylindrical members, when telescoped, define the horizontal pivot axis for the arm.

Still another object of the invention is to provide a supporting mechanism as set forth in the preceding paragraph, including stop means associated with said telescoped cylindrical members to define the aforesaid upper and lower limit positions for the arm. The stop means includes a pin member extending through aligned openings in the telescoped cylindrical members, with the opening in one of the cylindrical members being enlarged sufficiently to permit limited relative rotational movement between the cylindrical members, with portions of the periphery of the enlarged opening defining the limits of said rotational movement and thus the upper and lower positions of the arms.

DESCRIPTION OF THE DRAWINGS

FIG. 1 is a perspective view of a milking apparatus supported beneath a cow by means embodying the invention, with a substantial portion of the vertical adjusting mechanism cut away;

FIG. 2 is a partial section, on an enlarged scale, taken generally in the direction of line 2—2 in FIG. 1;

FIG. 3 is a section taken generally along the line 3—3 of FIG. 2, with the supporting arm for the milk receiving receptacle in an intermediate position permitting the receptable to hang substantially by gravity from the cow's teats;

FIG. 4 is a section similar to that of FIG. 3 with the supporting arm in its uppermost limit position; and FIG. 5 is a section similar to that of FIG. 3 with the supporting arm in its lowermost limit position.

DETAILED DESCRIPTION OF THE INVENTION

In the embodiment of the invention illustrated in the drawing, a cow C is shown being machine-milked with a milking system which includes a teat cup assembly, generally designated 12, including teat cups 12a of conventional construction attached to the cow's teats to deliver milk from the teats to a receptacle 13 through suitable interconnecting milk tubes 14. Associated with the receptacle 13 is a pulsator 15 which provides a periodic vacuum condition within the shells of teat cups 12a to facilitate the automatic withdrawal of the milk. From the receptacle 13, the milk is delivered through a tube 16 to a suitable carry-away milk pipeline of conventional construction (not shown in the drawings). A vacuum supply tube 18 leads from the pulsator 15 to a suitable vacuum line of conventional construction (not shown in the drawings).

As shown in the aforesaid patents, a milking parlor stall normally is so arranged that upon completion of a milking operation and removal of teat cups 12a from the cow's teats, the cow may leave the stall, permitting another cow to be admitted to the stall for a subsequent milking operation. As the height of the udders of different cows may vary substantially, it is desirable to provide means for supporting the receptacle 13 at correspondingly different elevations. To provide a proper tug and pull action on the cow's teats during a milking operation, it is desirable to adjust the elevation of the receptacle 13 accurately to permit a downward and forward biasing thereof exerting a steady downward and forward force which is converted into the proper periodic tug and pull action on the cow's teats by the pulsating vacuum action effected by pulsator 15.

Vertical adjustment of the receptacle 13 to accommodate cows of varying heights is performed by means such as that shown in the aforementioned patents which have a vertically movable rod 20 mounted on a support 22 for movement of the rod in the direction of arrows A (FIG. 1). The support 22 in turn is mounted on a horizontal cross member 24 of the milking parlor stall.

Forward biasing of the receptacle 13 is effected by a coil spring member 26 which has one end 26a extending through openings 27 in a plate 28 which is fixed to the bottom of rod 20. The other end of the coil spring 26 is operatively associated with a horizontal brace member 30 which has a sleeve portion 32 about rod 20. In a known manner, the spring 26 urges the brace member 30 forwardly in the direction of arrow B (FIG. 1) to exert the proper forward pull on the cow's teats through the teat cups 12a.

Downward biasing of the receptacle 13 for exerting a downward force on the cow's teats normally is provided by the weight of the milking apparatus, including the receptacle 13, as it hangs substantially by gravity from the cow's teats. A generally horizontally disposed arm 36 is connected to the outer end of the brace member 30 with the free end of the arm operatively connected to and supporting the receptacle 13. The arm 36 is of a strength sufficient to support the receptacle when the teat cups 12a are disconnected from the cow's teats.

Generally, the improvement of the present invention comprises a connecting means between the arm 36 and the vertically adjustable rod 20 to permit limited vertical movement of the arm relative to the rod between upper and lower positions with the receptacle hanging substantially by gravity from the cow's teats only when the arm is between said positions. In this manner, the proper downward force is exerted on the cow's teats when the arm is between said limit positions. The arm is prevented from moving upwardly beyond the upper limit position to prevent the cups 12a from riding up the cow's teats. The arm 36 is prevented from moving below the lower limit position so as to support the receptacle if the cups 12a are disconnected from the cow's teats.

More specifically, and referring particularly to FIGS. 2–5, the connecting means of this invention includes a pair of telescopic members, one defined by the outer end of the brace member 30 which is of a cylindrical tubular shape, and the other defined by a cylindrical boss 38 telescoped within the tubular brace 30 and connected to the arm 36 by a vertical sleeve portion 38a which receives a depending leg portion 40 on the end of the arm 36 opposite the receptacle 13 and held in place by a pin 42. A pair of washer shaped bearings 43 are secured about the cylindrical boss 38 and are of a diameter substantially the same as the interior cylindrical surface of the brace member 30. This telescopic connection defines a horizontal pivot between the arm 36, through the brace member 30, and the vertically adjustable rod 20, whereby the free end of the arm 36, to which is secured the receptacle 13, moves in a generally vertical direction in the direction of arrow D (FIG. 1) as the arm pivots vertically about the axes of the telescoped members 30 and 38.

A stop means in the form of a stop pin 44 is provided in association with the telescoped members 30, 38 to define the aforementioned upper and lower limit positions for the arm 36. The stop pin 44 extends through openings 46a, 46b in the tubular brace member 30 and through an opening 48 in the cylindrical boss 38. The openings 46a, 46b in the tubular brace member 30 are of a size to press fit snugly about the pin to prevent lateral or vertical movement of the pin. The opening 48 through the cylindrical boss 38 on the end of the arm 36 is enlarged as shown in FIGS. 2–5 to permit limited relative rotational movement between the telescoped members 30 and 38. The end marginal peripheries of the enlarged opening 48 thereby define the limits of said rotational movement and thus the upper and lower limit positions for the arm 36.

FIGS. 2 and 3 show the position of the pin 44 within the enlarged opening 48 when the arm 36 is intermediate the limit positions, with the milking apparatus hanging substantially by gravity from the cow's teats. FIG. 4 shows the position of the stop pin 44 within the enlarged opening 48 defining the upper limit position for the arm 36 to prevent the cups 12a from riding up the cow's teats. FIG. 5 shows the position of the stop pin 44 within the enlarged opening 48 defining the lower limit position for the arm 36 where the arm supports the receptacle should the cups 12a become disconnected from the cow's teats, or to support the receptacle when a different cow is being admitted to the stall.

The foregoing detailed description has been given for clearness of understanding only and no unnecessary limitations should be understood therefrom as some modifications will be obvious to those skilled in the art.

We claim:

1. In a supporting mechanism for a milking apparatus, including a rigid support structure, a vertically adjustable member mounted on said support structure, a milk receiving receptacle having attached thereto cups adapted to receive a cow's teats for milking, and a generally horizontally disposed arm mounted on said adjustable member and having a free end operatively connected to and supporting the receptacle and of a strength sufficient to support the receptacle when the cups are disconnected from the teats, the improvement comprising a pivot connection between said arm and said adjustable member to permit pivotal movement of the arm relative to the member in a generally vertical plane, said pivot connection including stop means to prevent vertical movement of said arm relative to said adjustable member upwardly beyond an upper limit position to prevent said cups from riding up the cow's teats and to prevent vertical movement downwardly below a lower limit position to support the receptacle if said cups are disconnected from the teats, the receptacle hanging substantially by gravity from the cow's teats when said arm is between said limit positions.

2. The mechanism of claim 1 wherein the pivot connection between said arm and said member has a generally horizontal pivot axis with said free end of the arm pivoting about said axis generally vertically between said limit positions.

3. The mechanism of claim 2 wherein said pivot connection is a telescopic connection between a pair of cylindrical members, one on said arm and one on said adjustable member, the axes of the cylindrical members when telescoped defining said pivot axis, and said stop means including engaging surfaces on said cylindrical members.

4. In a supporting mechanism for a milking apparatus, including a rigid support structure, a vertically adjustable member mounted on said support structure, a milk receiving receptacle having attached thereto cups adapted to receive a cow's teats for milking, and a generally horizontally disposed arm mounted on said adjustable member and having a free end operatively connected to and supporting the receptacle and of a strength sufficient to support the receptacle when the cups are disconnected from the teats, the improvement comprising a telescopic connection between a pair of cylindrical members, one on said arm and one on said adjustable member, stop means associated with said telescoped cylindrical members defining upper and lower limit positions for said arm, the axes of the cylindrical members when telescoped defining a generally horizontal pivot axis with said free end of the arm pivoting about said axis for movement generally vertically between said upper and lower limit positions with the receptacle hanging substantially by gravity from the cow's teats when said arm is between said limit positions.

5. The mechanism of claim 4 wherein said stop means includes a pin means extending through aligned openings in said telescoped cylindrical members, the opening in said one of said cylindrical members being enlarged sufficiently to permit limited relative rotational movement between said cylindrical members about said horizontal pivot axis, with portions of the periphery of said enlarged opening defining the limits of said rotational movement and thus said upper and lower limit positions.

References Cited

UNITED STATES PATENTS

| | | | |
|---|---|---|---|
| 2,497,299 | 2/1950 | Daily | 119—14.13 |
| 2,683,437 | 7/1954 | Merritt | 119—14.13X |
| 3,033,161 | 5/1962 | Babson | 119—14.13 |

HUGH R. CHAMBLEE, Primary Examiner

U.S. Cl. X.R.

119—14.13